Figure 1:
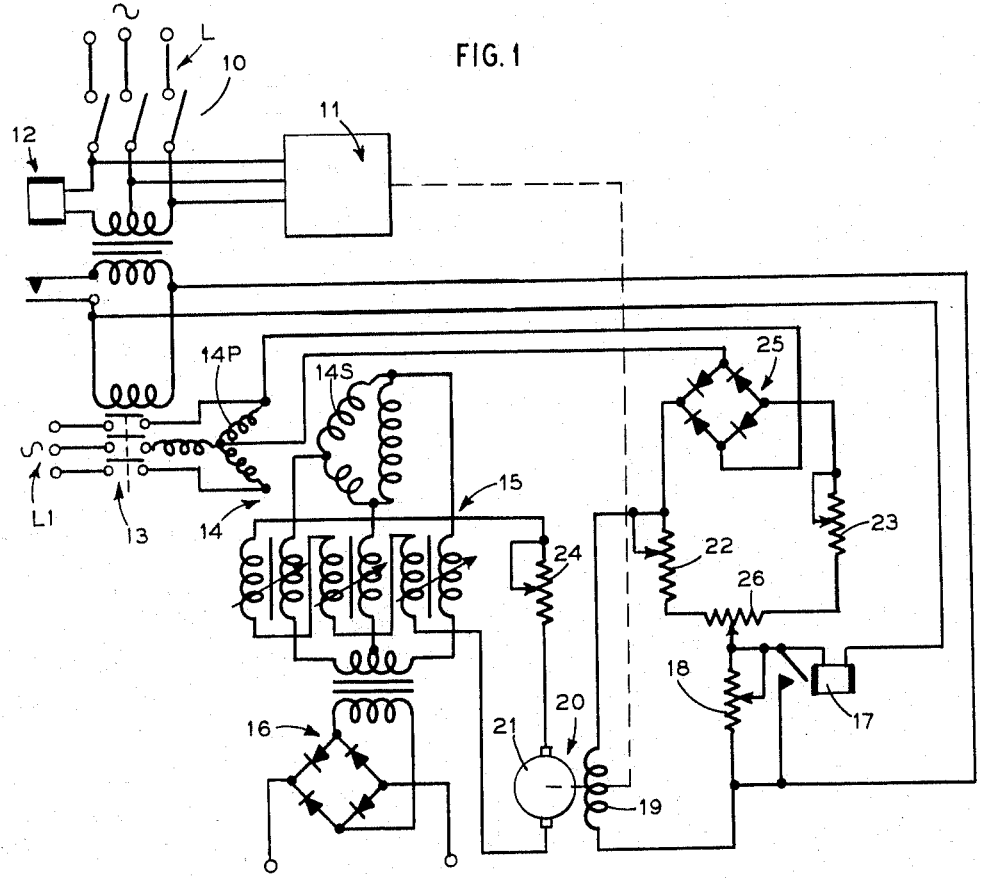

July 19, 1966  G. LEHNERT  3,261,960

APPARATUS FOR REGULATING WELDING CURRENT

Filed Oct. 21, 1965  2 Sheets-Sheet 1

INVENTOR.
Günther Lehnert
BY Philip S. Hilbert
ATTORNEY

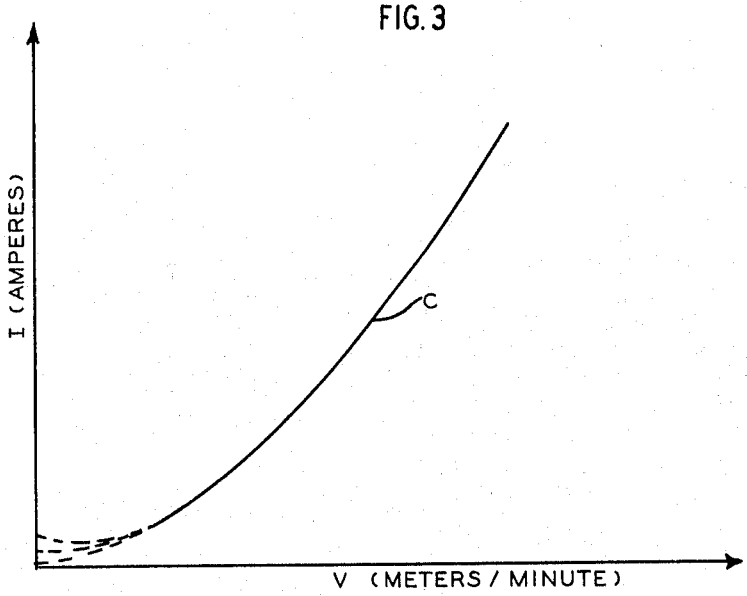
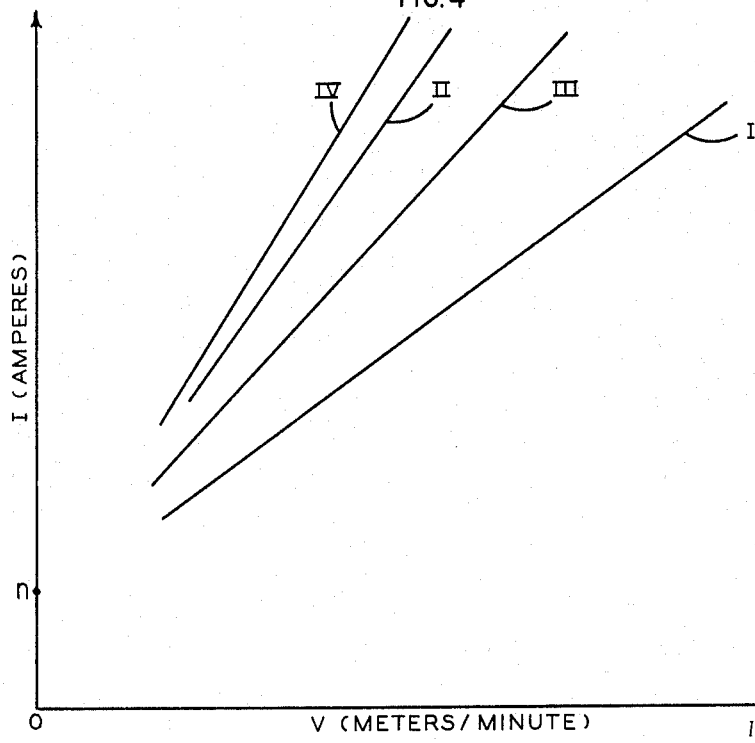

United States Patent Office 3,261,960
Patented July 19, 1966

3,261,960
APPARATUS FOR REGULATING
WELDING CURRENT
Günther Lehnert, Auf dem Limbrinke 27, Hannover-Bothfeld, Germany
Filed Oct. 21, 1965, Ser. No. 499,431
8 Claims. (Cl. 219—60)

This application is a continuation-in-part of my copending application Serial No. 198,690, filed May 25, 1962, now abandoned.

The invention concerns an apparatus for the automatic regulation of the welding current in arc-welding, specifically in the production of tubing or pipes which in the course of manufacture are made of a metal strip.

In the working cycle the metal strip is curved and deformed into a tube having adjacent longitudinal edges which are welded together by an electric arc that is formed between a fixed electrode and the moving tube. Such a production technique is used, for example, in the manufacture of metal cable casing.

In this connection it is known that the welding current is obtained from an A.C. reactor which is magnetically D.C. biased. The magnetic bias is derived from a D.C. current supplied by a tach-generator which is coupled to the tube draw-off device so that the welding current is regulated in accordance with the velocity with which the tube is moved ("drawing velocity").

This type of welding current regulation has, however, only limited application because with it, the characteristic curve for the welding current is non-linear. In particular, among other effects, the welding current increases too slowly in the range of the lower draw off velocities. Accordingly there is obtained poor welding of the welded seam or a completely defective welded seam, especially when starting up the welding operation, as the welding current is not regulated linearly with the drawing velocity.

The instant invention overcomes this disadvantage by providing in the exciter circuit of the tach-generator an adjustable voltage-divider for setting a base value of welding current which is dependent on the material being worked and providing in the armature circuit an adjustable resistor for adjusting a proportionality factor, depending on said material and its thickness to set the slope of the welding current characteristic curve. In this manner the invention makes it possible to obtain a linear welding current characteristic curve with its positions adjusted through the base value of welding current and its slope adjusted through the proportionality factor. The welding current is then regulated linearly with drawing velocity, the position and slope of the welding current characteristics being arbitrarily adjustable depending on the nature of the material of the tube being welded as well as on its thickness.

This regulation of the welding current is important because the value of such current has to depend on the drawing velocity as well as the thickness and composition of the material being welded. The invention makes it possible by adjusting the rate of current increase with increasing draw-off velocity, that is, the slope of the welding current characteristics, as well as the current necessary for the initiation of the welding process, that is, the position of the welding current characteristics, depending on the nature of the material being welded and on its thickness.

The means described in the invention so far does not however lead to the optimum objective; a welded seam which is uniformly perfect, since as the apparatus is started up, the tach-generator is at its lowest speed, leading to welding current characteristics which are not well defined. As a result, the seam may be irregular, even burnholes may occur in it. These holes can be enlarged through the transient current surge which occurs when the arc is struck.

It is already known that to limit the switching current surge which occurs when the current is turned on, a damping resistor that can be effectively disconnected may be included in the circuit; there have also been suggested various control possibilities for disconnecting the damping resistor after the decay of the switching-on transient current.

As a further feature of this invention a new control scheme for disconnecting such a damping resistor is disclosed, together with means for elimination of the irregularities of welding current at the lowest speeds. This feature of the invention contemplates the following: When the apparatus is started-up from standstill a first time-delay relay closes the welding circuit with delay and then a second time-delay relay, controlled by the first one, short-circuits, with delay, the damping resistor which had been placed in the exciter circuit for the purpose of limiting the switching-on current surge. By this means the ignition of the arc is delayed sufficiently until the tach-generator has reached a minimum speed. As a result, the ignition of the welding arc takes place in a well defined region of the welding current characteristics and the switching-on current surge is limited during the time interval when the damping resistor is switched in.

Using the combination of all the features of this invention, one obtains from the time of ignition of the arc up to full drawing off speed, a flawless weld which is matched to the workpiece being welded.

Figure 2:
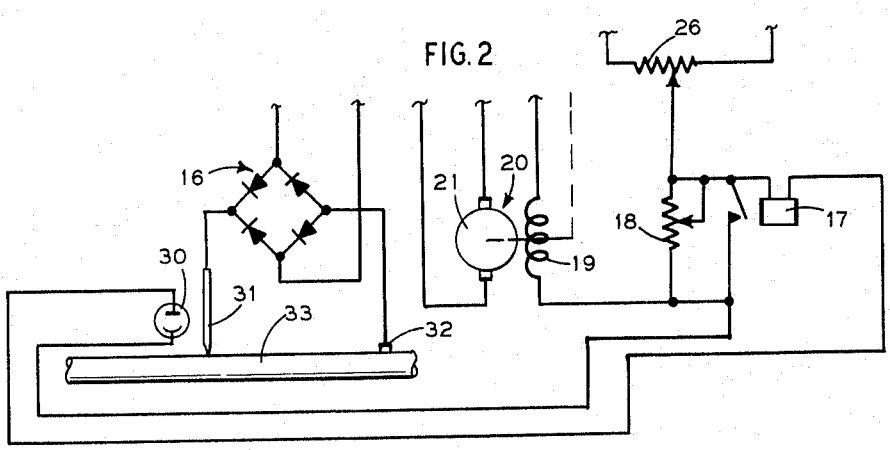

Further details and advantages of the present invention are discussed in connection with the accompanying drawings. The drawings show:

FIGURE 1, a circuit for regulation of welding current in accordance with the invention;

FIGURE 2, a portion of the circuit of FIGURE 1 with a modified detail;

FIGURE 3, a known welding current characteristics curve;

FIGURE 4, welding current characteristics which can be obtained by use of the procedures and apparatus described by the invention.

In the circuit of FIGURE 1 there is shown a main switch 10 for energizing the entire system. Through this switch the draw-off apparatus 11, shown schematically, is connected to the three-phase supply L. At the same time, as the main switch 10 is closed, a time delay relay 12 is energized. After a certain time interval this relay closes, thereby energizing the coil of contactor 13 which closes and connects the three-phase supply $L_1$ with the primary 14P of transformer 14. The secondary 14S of transformer 14 is in a circuit with a magnetically D.C. biased A.C. reactor 15 whose output is connected to the welding rectifier 16.

The magnetic D.C. biasing of the A.C. reactor 15 occurs through a tach-generator 20 which is coupled in velocity dependent manner to the draw-off apparatus 11 and whose armature 21 is connected to the magnetic biasing winding of the A.C. reactor 15 through a rheostat 24. The exciter winding 19 of the tach-generator 20 is supplied through a rectifier 25. Rectifier 25 begins to function when contactor 13 is closed. The output of rectifier 25 is connected to the exciter winding 19 directly by way of one path, and by way of a second path consisting of a voltage divider formed by adjustable resistors 22 and 23. The value of current as adjusted by the voltage divider can be varied manually in addition, when necessary, by use of rheostat 26 when values of the adjustable resistors 22 and 23 have been fixed. Between the tap of the rheostat 26 and the exciter winding 19 there is connected an adjustable damping resistor 18 which is short-circuited through the time-delay relay 17. This relay functions with a certain time delay after closing of time delay relay 12 and effects the short circuit.

In FIGURE 2 is shown a modification of the arrangement of FIGURE 1. In this figure, the adjustable damping resistor 18 is also short circuited through time-delay relay 17. Here, however, the time-delay relay 17 is not energized, after closing of time-delay relay 12, from the three-phase supply L; rather it is energized through a photocell 30. The photocell begins to function when the welding arc is ignited; this arc occurs between welding electrode 31 and the slotted pipe 33 which is connected to electrode 32.

With reference to FIGURES 3 and 4, the operation of the system shown in FIGURES 1 and 2 is described as follows:

When the welding current is controlled only through an A.C. reactor with D.C. magnetic biasing derived from a tach-generator without the features of this invention, that is without adjustability and linearization of the welding current characteristic curve and without a switchable damping resistor for limiting the switching-on current surge upon ignition of the arc, then one obtains a welding current characteristic curve of the approximate shape corresponding to the curve C shown in FIGURE 3. The characteristic is curved over its entire range so that the welding current increases too slowly especially in regions of low speeds. This slow increase results in poor fusion of the welded seam. In addition the welding current characteristic is not uniquely defined in the lowest speed range—this is indicated by the dashed lines—so that it can have discontinuities and other irregularities which would affect the welded seam if, at the lowest speeds the biasing of the A.C. reactor through the tach-generator suffices even to ignite the arc which is normally not the case.

Through the arrangement of the invention, by use of the voltage divider circuit with adjustable resistors 22 and 23 in the exciter circuit of the tach-generator 20 and through inclusion of the rheostat 24 in the armature circuit of the tach-generator 20 one achieves a linearization of the welding current characteristics so that they can be described by a linear function of the form, $I = mv + n$. In this formula:

$I$ = welding current, for example, in amperes
$v$ = drawing-off velocity, for example in meters/minute
$m$ = slope of the welding current characteristics, for example, in ampere-min./meter
$n$ = Base value of welding current, the theoretical intersection of the welding current characteristics with the ordinate (intercept), for example, in amperes.

Because the value of the welding current depends on the thickness and composition of the material being welded, for example a thick plate with high heat of fusion requires greater welding current than a thin plate with equal or even lower heat of fusion, the welding current characteristics must be matched to the workpiece being welded to obtain a perfect weld. Thus, the current must be coordinated to the thickness and composition of the workpiece through a choice of the constants $m$ and $n$ which determine the desired position and slope of the linear welding current characteristics. The value of $n$ is best determined empirically, depending on the material being welded so that its value results in the production of an arc giving a flawless weld. Also, $n$ may be set at a value sufficiently high to enable ignition of the arc for various materials, whereby $n$ may be a single set value. The value of $m$ is chosen depending on the workpiece, that is depending on the composition and thickness of the material being welded. The values of the constants $m$ and $n$ can be determined empirically once for each of a variety of materials and workpieces and then used repeatedly.

In FIG. 4 are shown a number of welding current characteristic curves which can be achieved by use of the features of this invention. Specifically, for example, line I shows a welding current characteristic of steel plate with 0.3 mm. thickness, the linear graph II applies for steel plate with 0.5 mm. thickness while lines III and IV give the welding current characteristics of copper plate of 0.5 mm. and 0.6 mm. thickness respectively. All these straight line graphs would intersect the ordinate at a value of base welding current, $n$; they have however not been drawn to that intersection because, as is explained below, the welding current is switched on only when a certain minimum velocity that can be preselected has been achieved. The welding current therefore does not in reality begin with the base value $n$ but with a larger value. The value of $n$ is however so chosen that when the minimum drawing velocity is reached the welding current will in each case be of a magnitude sufficient to produce a flawless welded seam. Thus, it is seen that the base value of welding current is a theoretical value which is used for adjustment but which in reality is never used for welding.

In the apparatus, the value of $m$ which determines the slope of the linear welding current characteristics is selected by adjustment of the rheostat 24 in the armature circuit of the tach-generator 20; the value of $n$ which determines the position of the linear welding current characteristics is fixed by adjustment of the variable resistors 22 and 23. The exciter winding 19 is supplied through these so that the tach-generator 20 has a fixed, preset excitation which would determine the base value $n$ of the welding current when the tach-generator begins to revolve, were the A.C. reactor 15 supplied simultaneously with alternating current.

According to the arrangement of the apparatus, this does not happen because of the action of time-delay relay 12. This relay switches the A.C. reactor 15 into the circuit only when a certain minimum drawing speed has been reached. In this manner the irregularity and undefined nature of the bias magnetization which occurs when the tach-generator is starting up, is prevented from affecting the welded seam.

When the apparatus shown in FIGURE 1 is energized by means of the main switch 10, the draw-off apparatus 11 and the tach-generator 20 begin to operate. The time delay relay 12 closes only after a time delay of for example 0.5 to 1 second and thereby switches on the A.C. reactor 15 and simultaneously the exciter of the tach-generator 20 through the exciter winding 19, the resistors 22 and 23 and the rectifier 25. The values of the resistors 22 and 23 have been preset for a certain value of $n$. Thus the A.C. reactor 15 can, with the closing of time delay relay 12 deliver a welding current which is linearly related to the velocity in accordance with the equation $I = mv + n$.

Resistor 26 connected with resistors 22 and 23 in a bridge circuit is not important for the operation of the system; it serves merely to permit manual adjustment of the base value of welding current while the unit is in operation.

After time-delay relay 12 closes, the exciter winding 19 is energized through the damping resistor 18 which serves to limit the switching-on transient surge when the arc ignites. After decay of this switching transient current surge, this damping resistor 18 is short-circuited by time-delay relay 17.

Time-delay relay 17, according to FIGURE 1 is energized after time-delay relay 12 has closed and closes with an additional time delay which corresponds to the duration of the switching transient current surge, shorting damping resistor 18.

According to FIGURE 2, time delay relay 17 is energized through photocell 30 when the arc ignites. Otherwise, the operation is the same as in FIGURE 1.

As various changes might be made in the embodiment of the invention herein disclosed without departing from the spirit thereof it is understood that all matter herein described shall be deemed illustrative and not limiting except as set forth in the appended claims.

What is claimed is:
1. For use with an arc welder which welds seams in a workpiece drawn by a draw-off device past a welding electrode means, apparatus for supplying welding current to the welding electrode means in accordance with the velocity of draw-off of the workpiece comprising: A.C. reactor coil means including an input winding means adapted to receive alternating current, output winding means for delivering welding current to the welding electrode means and D.C. control winding means for receiving a direct current whose amplitude controls the amplitude of the welding current delivered by said output winding means; a source of direct current whose amplitude is a function of the velocity of draw-off comprising a tach-generator mechanically driven by said draw-off device and including an exciter circuit and an armature circuit; means including first resistor means for connecting said armature circuit to said D.C. winding means; and means including second resistor means for electrically energizing said exciter circuit for linearizing the welding current versus draw-off velocity characteristic curve and for permitting the adjustment of the base and the slope of said curve.

2. The apparatus of claim 1 wherein said first resistor means is a rheostat for setting a proportionality factor $m$ which corresponds to the slope of said characteristic curve and whose value depends on the workpiece material, and wherein said second resistor means is an adjustable voltage divider for setting a theoretical base factor $n$ whose value depends on the material of the workpiece so that said characteristic curve is described by the equation $I=mv+n$, where: $I$ is the welding current in amperes; $v$ is the draw-off velocity; and $m$ and $n$ are constants.

3. The apparatus of claim 1 further comprising first time-delay means for igniting the welding arc, said first time-delay means being energized as said workpiece starts to move and operating a given time thereafter so that the welding arc is ignited only after the workpiece is moving at a given adjustable minimum speed.

4. The apparatus of claim 2 further comprising first time-delay means for igniting the welding arc, said first time-delay means being energized as said workpiece starts to move and operating a given time thereafter so that the welding arc is ignited only after the workpiece is moving at a given adjustable minimum speed.

5. The apparatus of claim 1 further comprising damping resistor means in said exciter circuit and means for short-circuiting said damping resistor means a given time after the igniting of the welding arc, said given time being related to the time required for the decay of the switching-on transient current surge when the welding arc is ignited.

6. The apparatus of claim 3 further comprising damping resistor means in said exciter circuit and means for short-circuiting said damping resistor means a given time after the igniting of the welding arc, said given time being related to the time required for the decay of the switching-on transient current surge when the welding arc is ignited.

7. The apparatus of claim 6 wherein said short-circuiting means includes second time-delay means which is energized by the operation of said first time-delay means and operates said given time thereafter.

8. The apparatus of claim 6 wherein said short-circuiting means includes: photosensitive means operable in response to presence of the welding arc; and second time-delay means which is energized by the operation of the photosensitive means and operates a given time thereafter to short circuit said damping resistor means.

References Cited by the Examiner

UNITED STATES PATENTS

| | | | |
|---|---|---|---|
| 1,215,913 | 2/1917 | Coulter | 219—135 X |
| 1,278,984 | 9/1918 | Morton | 219—124 |
| 1,967,198 | 7/1934 | Caputo | 219—59 X |
| 2,089,014 | 8/1937 | Bucknam et al. | 219—60 X |
| 2,261,684 | 11/1941 | Jones | 219—59 |
| 2,756,309 | 7/1956 | Donelan | 219—60 |
| 2,776,363 | 1/1957 | Payne | 219—124 |
| 2,951,972 | 9/1960 | Pomazal | 219—131 X |

RICHARD M. WOOD, *Primary Examiner.*

J. V. TRUHE, *Assistant Examiner.*